(12) United States Patent
Kelman et al.

(10) Patent No.: US 6,542,133 B1
(45) Date of Patent: Apr. 1, 2003

(54) MULTI-PURPOSE INSTRUMENT PANEL DISPLAY MECHANISM

(75) Inventors: Zinoviy Kelman, Bloomfield Hills, MI (US); Yuriy Taborisskiy, W. Bloomfield, MI (US)

(73) Assignee: Yazaki North America, Inc., Canton, MI (US)

( * ) Notice: Subject to any disclaimer, the term of this patent is extended or adjusted under 35 U.S.C. 154(b) by 190 days.

(21) Appl. No.: 09/663,472

(22) Filed: Sep. 15, 2000

(51) Int. Cl.[7] .................................................. G09G 5/00
(52) U.S. Cl. ........................ 345/7; 116/288; 116/28 R
(58) Field of Search ................................. 345/7; 40/1.6, 40/160; 446/14; 116/28, 288, 28 R; 340/825, 815.78; 362/481

(56) References Cited

U.S. PATENT DOCUMENTS

| | | | |
|---|---|---|---|
| 5,138,779 A | | 8/1992 | Earnest |
| 5,442,338 A | * | 8/1995 | Ayres et al. |
| 5,453,731 A | * | 9/1995 | Beyer |
| 5,831,820 A | | 11/1998 | Huang |
| 6,244,889 B1 | * | 6/2001 | James |

* cited by examiner

Primary Examiner—Matthew C. Bella
Assistant Examiner—Hau Nguyen
(74) Attorney, Agent, or Firm—Young & Basile P.C.

(57) ABSTRACT

A lighted display for a vehicle instrument panel in which a single light source is used to display a plurality of messages indicating various vehicle operating conditions. A plurality of light-using message plates is mounted adjacent the light source, each message plate being independently activated by an electrical muscle wire to move the associated message plate into the lighted region of the display. When vehicle operating parameters are such that the message is no longer needed, current to the muscle wire is shut off and the message plate is returned to its unilluminated rest position by a return spring.

15 Claims, 4 Drawing Sheets

MULTI-PURPOSE INSTRUMENT PANEL DISPLAY MECHANISM

FIELD OF THE INVENTION

This invention is in the field of vehicle instrument panel displays.

BACKGROUND OF THE INVENTION

Muscle or shape memory wires are known for use in various applications. The wires are made from a shape memory or bio-metallic material such as a nickel-titanium alloy. For example, U.S. Pat. No. 5,138,779 discloses an animated novelty button incorporating a muscle wire for selectively disclosing a hidden message. U.S. Pat. No. 5,831,820 discloses a muscle wire mechanism for ejecting a tape or disk from a storage house. A co-pending application assigned to the same owner as this application uses a contracting wire to change the position of a pointer on an instrument panel gauge, such as fuel, voltage, and temperature gauges.

The wires are often called "muscle wire" because they flex or shorten in length like muscle fibers when electrical current is passed through them. The wires contract quickly and silently. When power is shut off, the wires relax and cool, and return to their original length. A typical muscle wire is commercially available under the name "Flexinol". The specifications for different types of muscle wire vary, depending on the application, as to voltage, current, resistance, power, mass, wire length in relaxed and contracted conditions, and wire force.

Vehicle instrument panel displays typically comprise one-for-one LED/message window arrangements in which all possible messages displayed to the vehicle operator are single-purpose displays, each with an individual LED backlight, a reflector, and a translucent color-coded message window. The use of multiple LED backlights and message windows increases cost and takes up valuable space on the instrument panel.

SUMMARY OF THE INVENTION

Briefly, the invention is a muscle wire activated display mechanism for a vehicle instrument panel, in which an array of muscle wires is connected to an array of independently-activated message "plates" movable into and out of a single LED-backlighted display port. Depending on the signal that a signal-generating device such as a vehicle microprocessor determines should be sent to the vehicle operator, the appropriate message plate (ABS, seatbelt, low oil, etc.) is moved by the appropriate muscle wire through a mechanical range of motion into the display port, whereupon a backlight (preferably a multi-colored "RGB" type LED) lights a translucent message portion of the plate to give a visual indicator to the driver. Cost and the amount of instrument panel space taken up by displays are both reduced.

These and other features and advantages of the invention will become apparent upon further reading of the specification in light of the accompanying drawings.

DETAILED DESCRIPTION OF THE ILLUSTRATED EMBODIMENT

Figure 1:
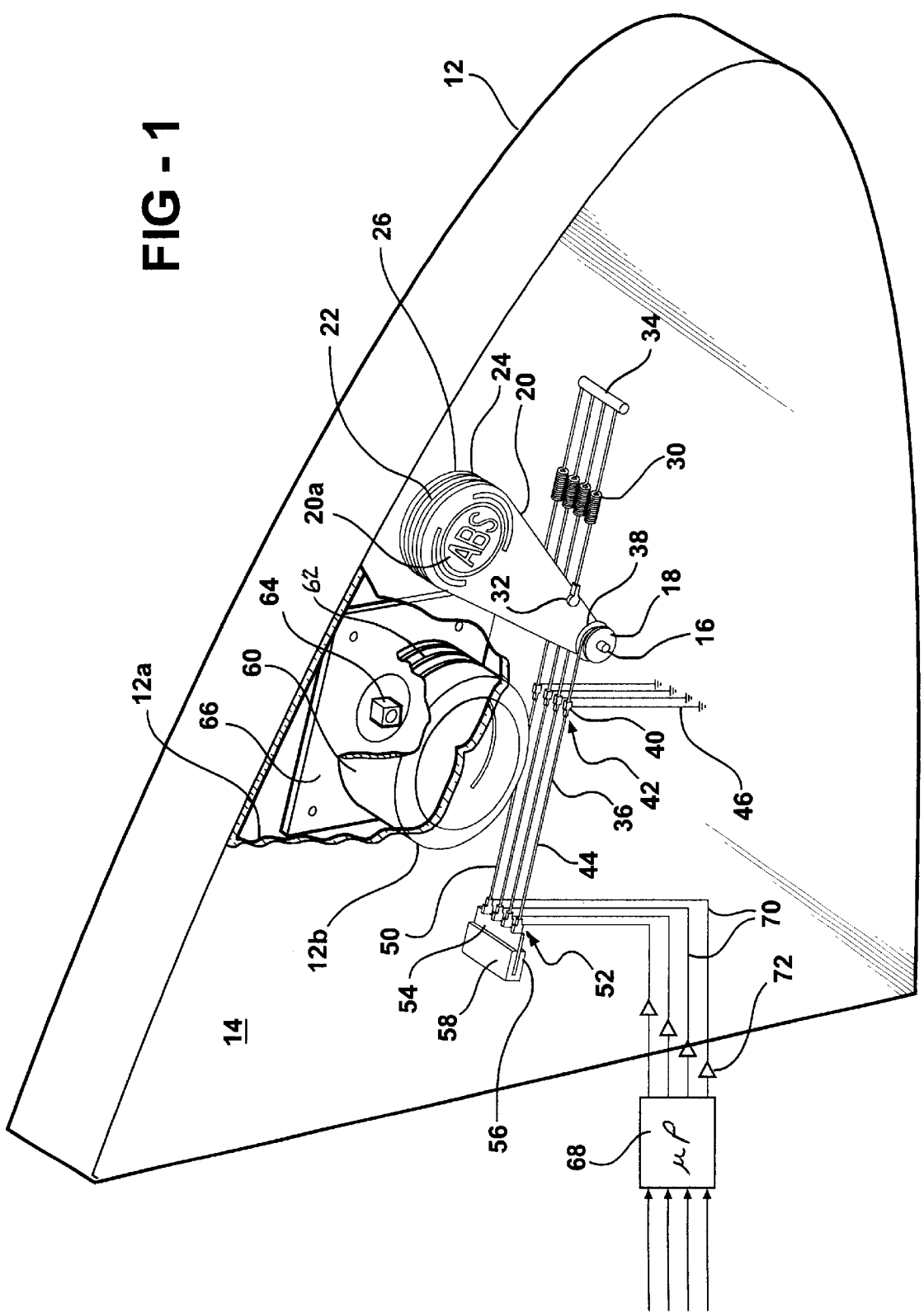
FIG. 1 is a perspective view of an instrument panel display mechanism according to the present invention.

FIG. 1 illustrates a preferred embodiment of a muscle wire driven vehicle display according to the invention, mounted in a housing 12, which in the illustrated embodiment is a module adapted to be plugged into a suitable recess in a vehicle instrument panel and to be subsequently connected to the vehicle electrical system and one or more vehicle signals or sensors. It will be understood by those skilled in the art that the manner in which the invention is mounted in a vehicle is not critical, and alternately to the plug-in module housing 12, the invention could be built directly into an existing instrument panel, or could be mounted at virtually any location in the vehicle at which a driver or passenger should be apprised of various vehicle operating system conditions. A driver instrument panel display will typically be the most useful location for the invention.

The interior of housing 12 is preferably hidden and protected with a cover 12a. In the illustrated embodiment, cover 12a is shown as being transparent over its entire surface, in order to better illustrate the mechanism underneath. In actual use, however, cover 12a is preferably opaque over most of its surface with the exception of a portion 12b which is open or transparent to allow the vehicle operator to view a message displayed by the mechanism inside. In the illustrated embodiment viewing area 12b is circular, although any shape and size opening or transparency can be used to accommodate visual design preferences.

A plurality of message display "plates" 20, 22, 24 and 26 are stored in a stacked, one-behind-the-other rest position illustrated in FIG. 1, adjacent a cylindrical light focusing housing or reflector 60. Each plate is preferably made from a plastic material, and may be primarily transparent except for a message portion 20a, 22a, 24a and 26a at their upper ends. Alternately, message portions 20a, etc. may comprise transparent or translucent windows with opaque lettering or symbols, while the remainder of each plate is opaque. Those skilled in the art will be aware of the various possibilities in view of available materials, and in view of customs and standards which may govern the format and lighting of certain messages or symbols. Typical messages include "ABS", "oil", and various symbols indicating hazard lights, overheating, open doors, and others well known to those skilled in the art.

The message plates are mounted for rotation on a shaft 16. In the illustrated embodiment, shaft 16 is fixed and each message plate is attached to shaft 16 at its lower end by a roller 18. The message plates are therefore capable of rotating or pivoting into and out of reflector 60 through corresponding slots 62 formed in the sidewall of the housing.

Rotation of each message plate into reflector 60 is performed by a muscle wire 44 attached to each roller 18, and return of each message plate from reflector 60 to the illustrated rest position is performed with a tension spring 30.

Figure 2:
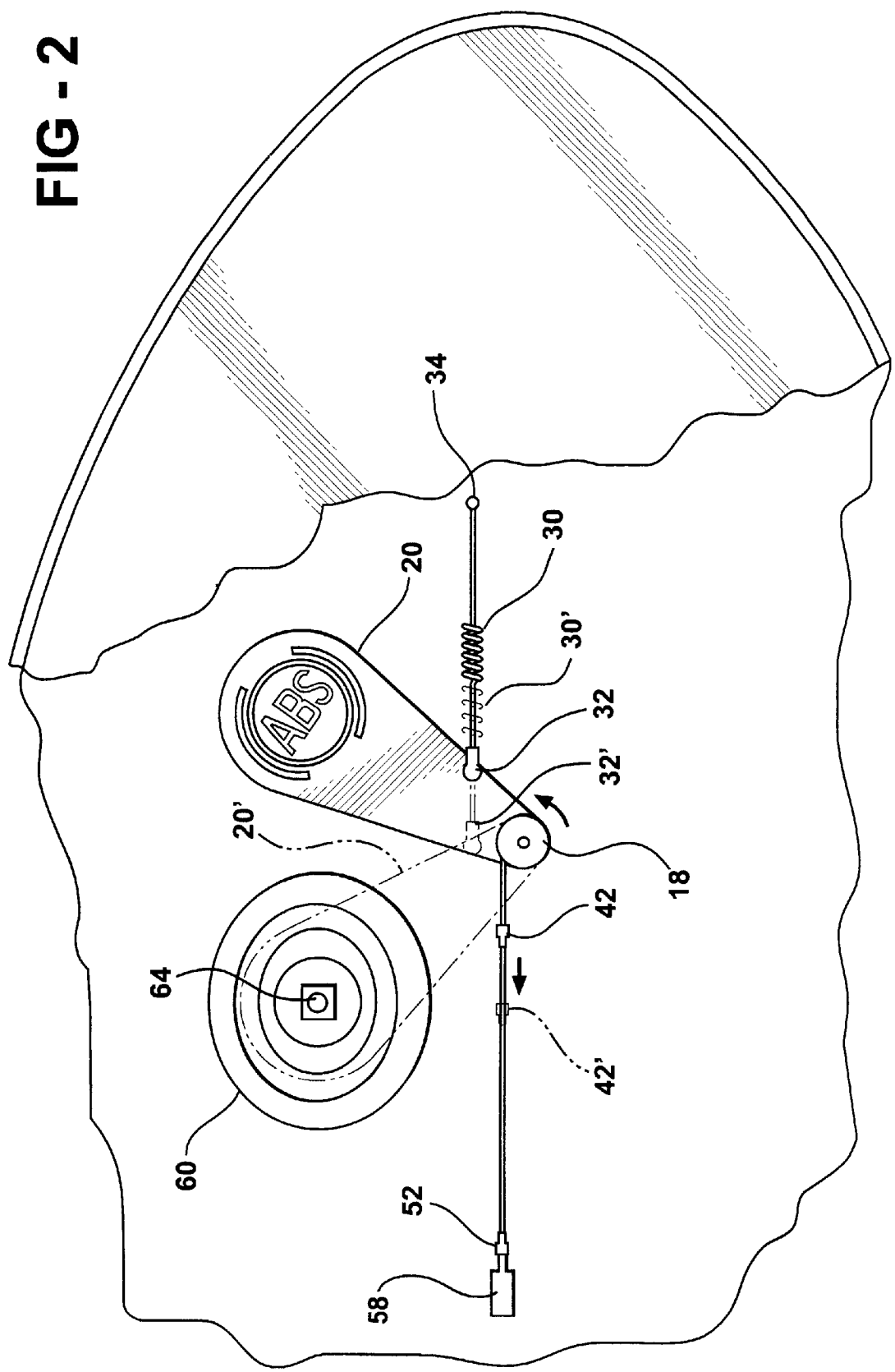
FIG. 2 is a front elevational view of the mechanism of FIG. 1, illustrating the operation of one possible message in broken lines.
Figure 3:
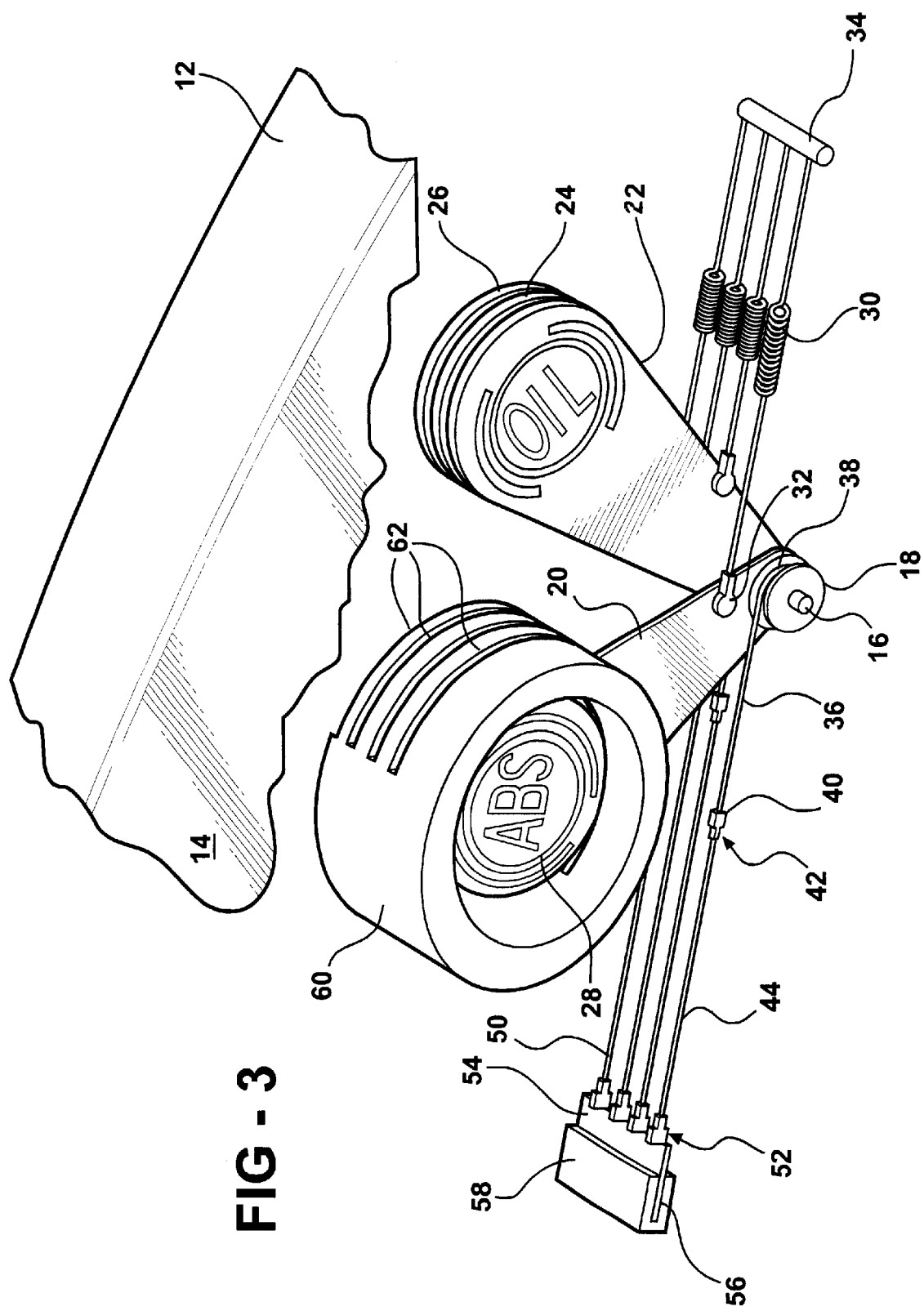
FIG. 3 is a perspective view of the display mechanism as shown in FIG. 2, further demonstrating the operation of one of the possible messages in the display.

Referring now to FIGS. 2 and 3, each spring 30 is attached at one end to an edge of one of the message plates by a fastener 32. The fasteners 32 may be of the pin and hole type, or may comprise some other known fastening device or method. The other end of each spring 30 is mounted in a fixed location, for example to a short post 34 extending from a rear wall of housing 12. In their at-rest or untensioned condition, the springs preferably hold the plates in a stacked relationship as illustrated in FIG. 1. This is achieved with springs of equal strength and length. It is important that each message plate be provided with its own independent spring return, for purposes described below.

Figure 2A:
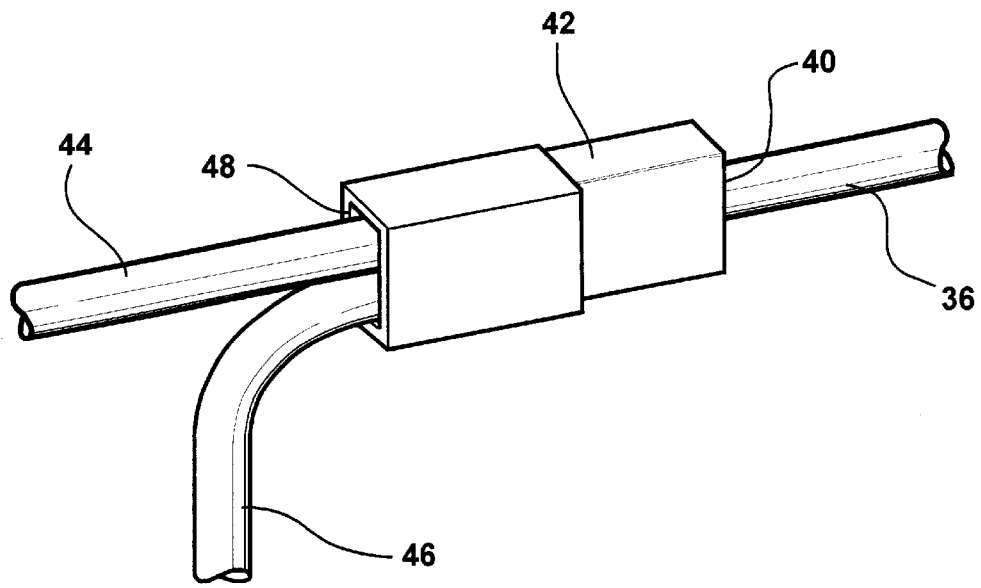
FIG. 2A is a perspective view of a connector used to join a muscle wire with a ground wire and with a drive cable.

Opposite each spring member 30, each muscle wire 44 is connected to the roller 18 on each message plate with a short length of electrically non-conductive thread, wire or cable 36 at a radially outward portion of the roller in spool fashion. Each cable 36 and its associated muscle wire extends from its roller in a direction opposite and preferably parallel to the direction of spring element 30. A first end 38 of each cable 36 is secured to its roller in known manner, including but not limited to adhesive, solder, screws, etc. A second end 40 of each cable 36 is secured to muscle wire 44 via a connector member 42 as best shown in FIG. 2A. FIG. 2A is a close up of the connection between each muscle wire 44 and non-conductive cable 36 via a three-way electrical connector 42 of generally known type. The electrical connector 42 not only physically connects non-conductive cable 36 to muscle wire 44, but further electrically connects muscle wire 44 to a ground wire 46 (see FIG. 1). The ends of the various wires and cables in connector 42 can be secured in place with adhesive, solder, or by crimping or similar mechanical connection.

Figure 2B:
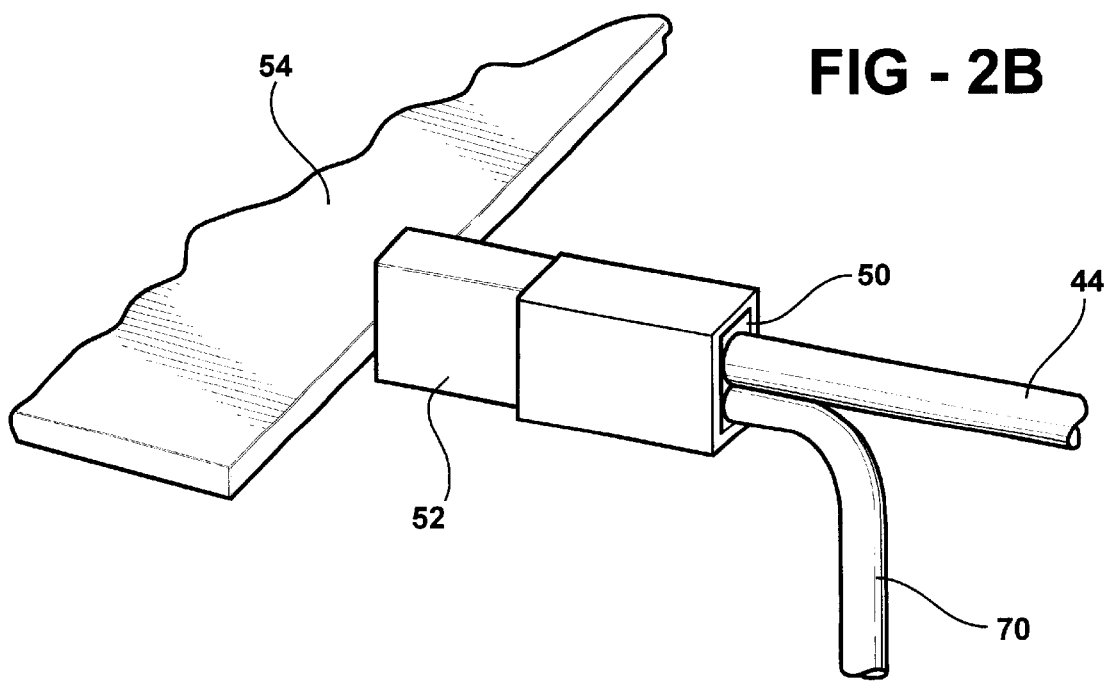
FIG. 2B is a perspective view of a connector used to join a muscle wire with a contact wire and with an anchor point.

Referring next to FIGS. 2 and 2B, the opposite end of each muscle wire 44 is connected with a similar electrical connector 52 to some sort of anchor point such as the bar and holder structure 54, 56, 58 illustrated. The end of connector 52 can be fastened to an anchor such as 54 by any known means, including welding, adhesive, solder or mechanical fastener. Alternately, each connector 52 may be molded integrally with an anchor point such as bar 54. Anchor point 54, like cable 36, is electrically non-conductive.

The other end of connector 52 receives one end of muscle wire 44 and electrically connects it to an electrical contact wire 70 in known manner (see FIG. 1).

Muscle wires 44 contract or shorten when an electrical current is applied to them. Contraction of a muscle wire 44 therefore results in the rotation of attached roller 18, thereby pulling the associated message plate out of its rest position and into reflector 60 where its message portion can be illuminated to the vehicle operator. Spring element 30 is accordingly stretched and placed under tension as long as muscle wire 44 remains in its contracted state, i.e., for as long as electrical current is applied to the muscle wire. When current is cut off, the muscle wire relaxes, thereby allowing tension spring 30 to pull the message plate out of reflector 60 and return it to its rest position as shown in FIG. 2.

Referring back to FIG. 1, the circuitry used to operate the vehicle display mechanism is illustrated in schematic fashion. Illumination of the message plates in reflector 60 can be accomplished by any known lighting mechanism, for example incandescent bulbs, light emitting diodes (LED's), fiber optics, etc. In the illustrated embodiment, an LED 64 is mounted on a printed circuit board (PCB) 66 behind or on a rear wall of housing 12, aligned with reflector 60 to shine light into and through the reflector. An advantage of the present invention is the use of a single light source and a single reflector to illuminate the multiple messages, and for this purpose the light source such as LED 64 is preferably capable of emitting different colors of light. In the case of an LED, an "RGB" (red/green/blue) type is capable of creating several different colors and is preferred.

Connectors 42 on the roller end of each muscle wire are grounded by wires 46 to a suitable vehicle part. Connectors 52 at the opposite, anchored end of the muscle wires are each connected by an electrical contact wire 70 to a microprocessor 68. An amplifier 72 may be used in the electrical path between microprocessor 68 and muscle wire connectors 52 to strengthen signals from the microprocessor in known fashion. The microprocessor receives signals from sensors monitoring the conditions of various vehicle components or systems, processes these signals using internal software, assigning a priority if necessary, and sends current through a selected contact wire 70. The current causes the paired muscle wire to contract, pulling on roller cable 36. The cable moves the associated roller 18 about shaft 16, causing the associated message plate to pivot from its rest position under spring tension into the reflector through the associated slot 62. Light source 64 behind the reflector is simultaneously activated by the microprocessor through a wire signal connection (or it may be on continuously), resulting in the message on the plate being illuminated to the vehicle operator.

Microprocessor 68, based on signals it receives from the vehicle component or system which the activated message plate represents, decides when to remove the message and/or substitute a different message plate depending on the timing of certain vehicle operating conditions and any priority as to display order. Once the microprocessor determines that no further visual message is needed for the operator, the microprocessor shuts off the current through contact wire 70 to the associated muscle wire 44, and the muscle wire returns to its original length. Associated spring element 30 reflector and back to its rest position.

Muscle wire contraction and spring tension are best illustrated in FIG. 2, with arrows, broken lines and primed numerals indicating the "active" positions of the message plate and its activating components.

Since minor changes and modifications vary for particular operating requirements and environments, it will be understood by those skilled in the art that this invention is not to be considered limited to the specific examples chosen for purpose of illustration. The illustration is meant to include all changes and modifications which do not constitute a departure from the true spirit and scope of this invention as claimed in the following claims and as represented by reasonable equivalents to the claimed elements. For example, while message plates 20, 22, 24, and 26 are illustrated as elongated, somewhat teardrop-shaped plates, other shapes of message plate can be used. While the illustrated embodiments show muscle wire activation of rotatable message plates, it will be understood that the inventive muscle wire activating mechanism could also be used to translate sliding message plates in and out of reflector 60. While a reflector housing such as 60 is preferred, virtually any known light directing structure can be used as long as the message plates are capable of being placed in the path of the light to the driver. While a simple spring return is preferred for counteracting the activating muscle wire, it would also be possible to use other return or biasing mechanisms, such as a counteracting muscle wire, to return each message plate to its rest position. These are simply a few examples of the minor ways in which the invention can be made to differ from the preferred embodiment illustrated herein and remain within the scope of the invention.

We accordingly claim:

1. For use in a vehicle instrument display, an apparatus for displaying an illuminated message indicating one or more vehicle operating parameters, comprising:

a light emitting element;

a light directing path associated with the light emitting element and adapted to direct the light from the light emitting element to someone using the vehicle;

a plurality of message plates each independently mounted for movement from a rest position into and out of the light directing path;

means for providing activating current signals corresponding to a condition or operating parameter of the vehicle related to messages on the respective message plates;

a plurality of muscle wires operatively connected to respective message plates, each muscle wire connected to receive an activating current signal from the vehicle such that the activated message plate is moved into the light directing path, a portion of the message plate being formed to selectively transmit the directed light and thereby create a visual indicator to a user of the vehicle of a condition or operating parameter of the vehicle.

2. The apparatus of claim 1, wherein the light emitting element comprises a single element capable of producing a plurality of colors.

3. The apparatus of claim 1, wherein the message plates are biased to the rest position out of the light directing path.

4. The apparatus of claim 3, wherein the message plates are each connected to a return spring arranged to bias each message plate to the rest position.

5. The apparatus of claim 4, wherein each muscle wire extends in a first direction away from the message plate to which it is connected, and the return spring extends in a second direction opposite the first direction.

6. The apparatus of claim 1, wherein the light directing path comprises a housing, and the message plates in their rest position are located outside the housing, and further wherein the housing comprises a plurality of openings adapted to receive the message plates therein.

7. The apparatus of claim 6, wherein the housing further defines a stop located to limit the movement of the message plate in the direction of muscle wire contraction.

8. The apparatus of claim 1, wherein the message plates are mounted for rotational movement.

9. The apparatus of claim 1, wherein each muscle wire is operatively attached to a message plate with a non-conductive attachment.

10. The apparatus of claim 9, wherein each muscle wire is attached at a second end to a non-conductive anchor point.

11. The apparatus of claim 10, wherein each muscle wire is attached at one end to the non-conductive attachment with an electrical connector further connected to ground, and at its other end to the non-conductive anchor point with an electrical connector further connected to a source of electric current.

12. The apparatus of claim 1 wherein the signal providing means is a microprocessor connected to each of the muscle wires and further adapted to be connected to the vehicle so as to sense vehicle operating parameters, the microprocessor further being adapted to generate muscle wire activating signals in response to vehicle operating parameters so as to selectively activate the muscle wires and move their respective message plates into the light directing path.

13. In a vehicle instrument panel, an apparatus for displaying a message to a person using the vehicle indicating a vehicle operating parameter, comprising:

a light emitting element in the instrument panel;

a light directing element associated with the light emitting element, to direct light from the light emitting element so as to be visible from the instrument panel to the person using the vehicle;

a plurality of message plates each independently mounted in the instrument panel, the message plates being separately movable from a rest position out of the directed light to an active position in the directed light, each message plate having a portion adapted to use the directed light to display a vehicle operating parameter message to the user of the vehicle;

a plurality of muscle wires operatively connected to respective message plates and to an anchor point in the instrument panel, and further connected to receive an electrical signal from the vehicle corresponding to a vehicle operating parameter related to a message on the message plate, each muscle wire being responsive to the electrical signal to contract and pull the associated message plate into the light directed by the directing element to display a message to the user of the vehicle.

14. The apparatus of claim 13, wherein the message plates are each further connected to a spring return means which normally pulls the message plate to a rest position out of the directed light, and which returns the message plate from the active position to the at rest position when the muscle wire is deactivated.

15. The apparatus of claim 14, wherein the message plates are rotatably mounted on a common axis adjacent a light directing housing, and the housing includes a plurality of openings corresponding to each of the message plates to allow the plates to be rotated by the muscle wires into and out of the housing.

* * * * *